US012794159B2

(12) United States Patent
Wang et al.

(10) Patent No.: US 12,794,159 B2
(45) Date of Patent: Nov. 10, 2026

(54) TERMINAL AND PROCESSING METHOD THEREFOR

(71) Applicant: Changchun Jetty Automotive Technology Co., Ltd., Changchun (CN)

(72) Inventors: Chao Wang, Changchun (CN); Yun Miao, Changchun (CN)

(73) Assignee: Changchun Jetty Automotive Technology Co., Ltd., Changchun (CN)

( * ) Notice: Subject to any disclaimer, the term of this patent is extended or adjusted under 35 U.S.C. 154(b) by 320 days.

(21) Appl. No.: 18/413,053

(22) Filed: Jan. 16, 2024

(65) Prior Publication Data

US 2024/0154338 A1 May 9, 2024

Related U.S. Application Data

(63) Continuation-in-part of application No. PCT/CN2022/105966, filed on Jul. 15, 2022.

(30) Foreign Application Priority Data

Jul. 15, 2021 (CN) ......................... 202110803154.4
Jul. 15, 2021 (CN) ......................... 202121615279.6

(51) Int. Cl.
*H01R 13/15* (2006.01)
*H01R 13/03* (2006.01)
*H01R 43/16* (2006.01)

(52) U.S. Cl.
CPC ............. *H01R 13/15* (2013.01); *H01R 13/03* (2013.01); *H01R 43/16* (2013.01)

(58) Field of Classification Search
CPC .... H01R 13/187; H01R 13/03; H01R 13/111; H01R 13/15; H01R 43/16
(Continued)

(56) References Cited

U.S. PATENT DOCUMENTS 4,720,157 A * 1/1988 Nestor ................. H01R 13/187 439/843
5,676,571 A * 10/1997 Matthews ............ H01R 13/187 439/843
(Continued)

FOREIGN PATENT DOCUMENTS

CN 205846295 U 12/2016
CN 106654652 A 5/2017
(Continued)

OTHER PUBLICATIONS

English translation of CN210224392 (Year: 2026).*
(Continued)

*Primary Examiner* — Tho D Ta
*Assistant Examiner* — Carlos E Lopez-Pagan
(74) *Attorney, Agent, or Firm* — Renner, Otto, Boisselle & Sklar, LLP

(57) ABSTRACT

The present application provides a terminal and a processing method thereof. The terminal includes a connecting portion, a first fixing portion and a conducting portion that are connected in sequence. The connecting portion is used for being connected to a cable. The conducting portion includes a plurality of elastic sheets that are arranged at intervals in a circumferential direction. First ends of the elastic sheets are all fixedly connected to the first fixing portion, and a first groove is arranged between any two adjacent elastic sheets. The present application alleviates the technical problems of large contact resistance and high temperature rise at the connection position of the existing plug-in terminal.

20 Claims, 9 Drawing Sheets

A-A

(58) Field of Classification Search
USPC ................................ 439/255, 851, 843, 856
See application file for complete search history.

(56) References Cited

U.S. PATENT DOCUMENTS

| | | | | |
|---|---|---|---|---|
| 10,320,130 | B2 | 6/2019 | Xu | |
| 2006/0089058 | A1* | 4/2006 | Derleth | H01R 13/187 439/877 |
| 2015/0024641 | A1* | 1/2015 | Lascelles | H01R 13/187 29/857 |
| 2018/0212370 | A1 | 7/2018 | Xu | |
| 2019/0140365 | A1* | 5/2019 | Kung | H01R 43/0256 |
| 2019/0305455 | A1* | 10/2019 | Uppleger | H01R 13/111 |

FOREIGN PATENT DOCUMENTS

| | | | |
|---|---|---|---|
| CN | 106785559 | A | 5/2017 |
| CN | 106816740 | A | 6/2017 |
| CN | 107394445 | A | 11/2017 |
| CN | 206834388 | U | 1/2018 |
| CN | 206850065 | U | 1/2018 |
| CN | 207282773 | U | 4/2018 |
| CN | 108110470 | A | 6/2018 |
| CN | 209045850 | U | 6/2019 |
| CN | 209183817 | U | 7/2019 |
| CN | 209592483 | U | 11/2019 |
| CN | 209692008 | U | 11/2019 |
| CN | 210224392 | U * | 3/2020 |
| CN | 213212475 | U | 5/2021 |
| CN | 113410684 | A | 9/2021 |
| CN | 216671958 | U | 6/2022 |
| GB | 2065993 | A | 7/1981 |
| JP | H03155073 | A | 7/1991 |
| JP | 2018156772 | A | 10/2018 |

OTHER PUBLICATIONS

First Office Action issued for corresponding Japanese Patent Application 2024-501574 mailed on Jan. 28, 2025.
Extended European Search Report issued on Jan. 14, 2025 for counterpart European patent application No. 22841487.6.
International Search Report mailed Sep. 26, 2022, for International Application No. PCT/CN2022/105966.
First Office Action issued Nov. 16, 2021, for Chinese Patent Application No. 202121615279.6.
Second Office Action issued Feb. 23, 2022, for Chinese Patent Application No. 202121615279.6.
Search Report for Chinese Patent Application No. 202121615279.6.
Decision of Rejection issued on Sep. 19, 2025 for counterpart Chinese patent Application No. 202110803154.4, and its English translation.
First Office Action and Search Report issued for corresponding Chinese Patent Application No. 202110803154.4, mailed on Apr. 11, 2025.
Second Office Action issued for corresponding Japanese Patent Application No. 2024-501574, mailed on Jun. 3, 2025.

* cited by examiner

TERMINAL AND PROCESSING METHOD THEREFOR

RELATED APPLICATION

The present application is a continuation-in-part of International Application No. PCT/CN2022/105966, filed on Jul. 15, 2022, which claims priority to Chinese Invention Patent Application No. 202110803154.4 filed on Jul. 15, 2021, and the Chinese Utility Model Patent No. 202121615279.6 filed on Jul. 15, 2021, all of which are hereby incorporated by reference in their entireties.

TECHNICAL FIELD

The present application relates to the technical field of electrical components, in particular to a terminal and a processing method thereof.

BACKGROUND

Wire harnesses are commonly used in electrical connections to conduct current and transmit signals. A terminal of the wire harness is equipped with a plug-in terminal that is used for being connected with a corresponding wire. The plug-in terminals can be can be classified as male terminals, and female terminals that can be fit with the male terminals. In general, the female terminal is provided with a hole into which the male terminal can be inserted, so that the male terminal and the female terminal are plugged with each other, and the male terminal and the female terminal are in contact with each other to conduct electricity through the contact area. However, the existing plug-in terminal has the technical problems of large contact resistance and high temperature rise at the connection position.

SUMMARY

An object of the present application is to provide a terminal and a processing method thereof to alleviate the technical problems of large contact resistance and high temperature rise at the connection position of the existing plug-in terminal.

The above object of the present application can be achieved by adopting the following technical solutions.

An embodiment of the first aspect of the present application provides a terminal including a connecting portion, a first fixing portion and a conducting portion that are connected in sequence. The connecting portion is used for being connected to a cable. The conducting portion includes a plurality of elastic sheets that are distributed at intervals in a circumferential direction. First ends of the elastic sheets are all fixedly connected to the first fixing portion, and a first groove is arranged between any two adjacent elastic sheets.

An embodiment of the second aspect of the present application provides a processing method of a terminal, including:

step S10: forming a connecting portion, a first fixing portion, a conducting portion and a second fixing portion, the connecting portion being connected to a cable, the conducting portion including a plurality of elastic sheets that are arranged at intervals in a circumferential direction, first ends of the elastic sheets being all fixedly connected to the first fixing portion, and a first groove being arranged between any two adjacent elastic sheets, the second fixing portion being located at one end of the conducting portion that faces away from the first fixing portion, and second ends of the elastic sheets being all fixedly connected to the second fixing portion;

step S20: forming a plurality of overhanging sheets that are distributed at intervals in the circumferential direction at an outer end of the second fixing portion;

step S30: folding over the overhanging sheets outwards until end portions of the overhanging sheets are fixedly connected to the first fixing portion to form a conducting cylinder that sleeves on an outer side of the conducting portion.

The present application has the following characteristics and advantages:

The terminal can be used as a male terminal or a female terminal. When the terminal is a used as a male terminal, the elastic sheets can be expanded outward due to their own elasticity, so as to be in close contact with the mating female terminal, so that, on the one hand, the reliability of the connection is ensured to avoid loosening, and on the other hand, the elastic sheets can keep fitting with the female terminal by their own elasticity, thus increasing the contact area of plug-in fitting. When the terminal is used as a female terminal, the elastic sheets can be contracted inward due to their own elasticity, so as to be in close contact with the mating male terminal, so that, on the one hand, the reliability of the connection is ensured to avoid loosening, and on the other hand, the elastic sheets can keep fitting with the male terminal by their own elasticity, thus increasing the contact area of the plug-in fitting.

The terminal has the following advantages:

(1) the terminal can ensure reliability of mechanical connection of the plug-in fitting, and there is elasticity during plug-in to avoid loosening;

(2) the terminal can increase the contact area of the plug-in fitting, so as to reduce contact resistance and improve conductive property;

(3) the terminal can reduce the temperature rise of the contact area during current conduction, which can avoid reduction in elasticity of the terminal, reduce the deformation, and prolong the service life of the terminal;

(4) the terminal is easy to process and install, the processing is simple, thereby saving the material and saving the cost.

BRIEF DESCRIPTION OF DRAWINGS

The drawings illustrated here provide a further understanding of the present application, and constitute a part of the present application rather than limitations thereto. In the drawings.

DETAILED DESCRIPTION OF EMBODIMENTS

For a clearer understanding of the objectives, technical features and effects of the embodiments of the present disclosure, specific embodiments will now be described with reference to the drawings. The described embodiments are intended only to schematically illustrate and explain the present application and do not limit the scope of the present application.

Figure 1:
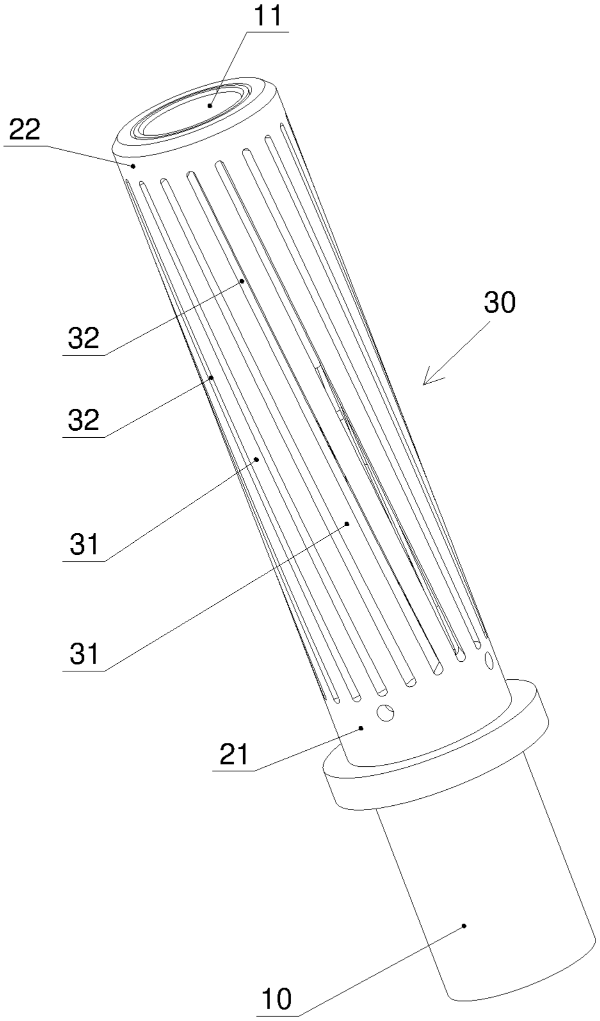
FIGS. 1 to 4 are structural schematic diagrams of a terminal according to an embodiment of the present application.
Figure 5:
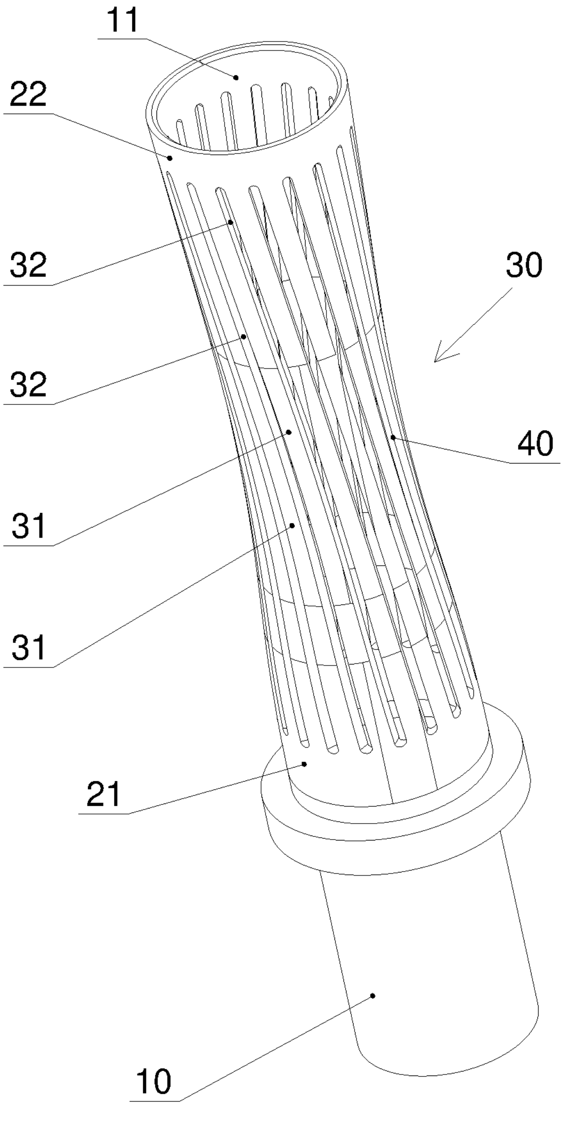
FIGS. 5 to 9 are structural schematic diagrams of a terminal according to another embodiment of the present application.

An embodiment of the first aspect of the present application provides a terminal, as shown in FIGS. 1 and 5, the terminal includes a connecting portion 10, a first fixing portion 21 and a conducting portion 30 that are connected in sequence. The connecting portion 10 is used for being connected to a cable. The conducting portion 30 includes a plurality of elastic sheets 31 that are arranged at intervals in a circumferential direction. First ends of the elastic sheets 31 are all fixedly connected to the first fixing portion 21. A first groove 32 is arranged between any two adjacent elastic sheets 31.

The terminal can be used as a male terminal or a female terminal. When the terminal is a male terminal, the elastic sheets 31 can be expanded due to their own elasticity, so as to be in close contact with the mating female terminal, so that, on the one hand, the reliability of the connection is ensured to avoid loosening, and on the other hand, the elastic sheets 31 can keep fitting with the female terminal by their own elasticity, thus increasing the contact area of plug-in fitting. When the terminal is used as a female terminal, the elastic sheets 31 can be contracted inward due to their own elasticity, so as to be in close contact with the mating male terminal, so that, on the one hand, the reliability of the connection is ensured to avoid loosening, and on the other hand, the elastic sheets 31 can keep fitting with the male terminal by their own elasticity, thus increasing the contact area of the plug-in fitting.

The terminal has the following advantages: (1) the terminal can ensure reliability of mechanical connection of the plug-in fitting, and there is elasticity during plug-in to avoid loosening; (2) the terminal can increase the contact area of the plug-in fitting, resulting in small contact resistance and improving conductive property; (3) the terminal can reduce the temperature rise of the contact area during current conduction, which can avoid reduction in elasticity of the terminal, reduce the deformation, and prolong the service life of the terminal; (4) the terminal is easy to process and install, the processing is simple, thereby saving the material and saving the cost.

In an embodiment, the terminal includes a second fixing portion 22 located at one end of the conducting portion 30 that faces away from the first fixing portion 21, and the second ends of the elastic sheets 31 are all fixedly connected to the second fixing portion 22. By providing the first fixing portion 21 and the second fixing portion 22, both ends of the first groove 32 are closed, which further improves reliability of mechanical connection of the plug-in fitting, thereby avoiding loosening.

As shown in FIGS. 1 to 8, the terminal is provided with a terminal hole 11 that extends throughout the second fixing portion 22 and the conducting portion 30, and the terminal is a female terminal. An external terminal can be inserted into the terminal hole 11. In the embodiment, a cylinder structure that sleeves on the outer side of the conducting portion 30 is eliminated, thereby saving the material, reducing the processing and assembly difficulty, making the processing simpler, and reducing the cost. Further, an end portion of the terminal hole 11 that faces away from the first fixing portion 21 is chamfered or rounded to facilitate the external terminal to enter into the terminal hole 11 during plug-in.

Figure 6:
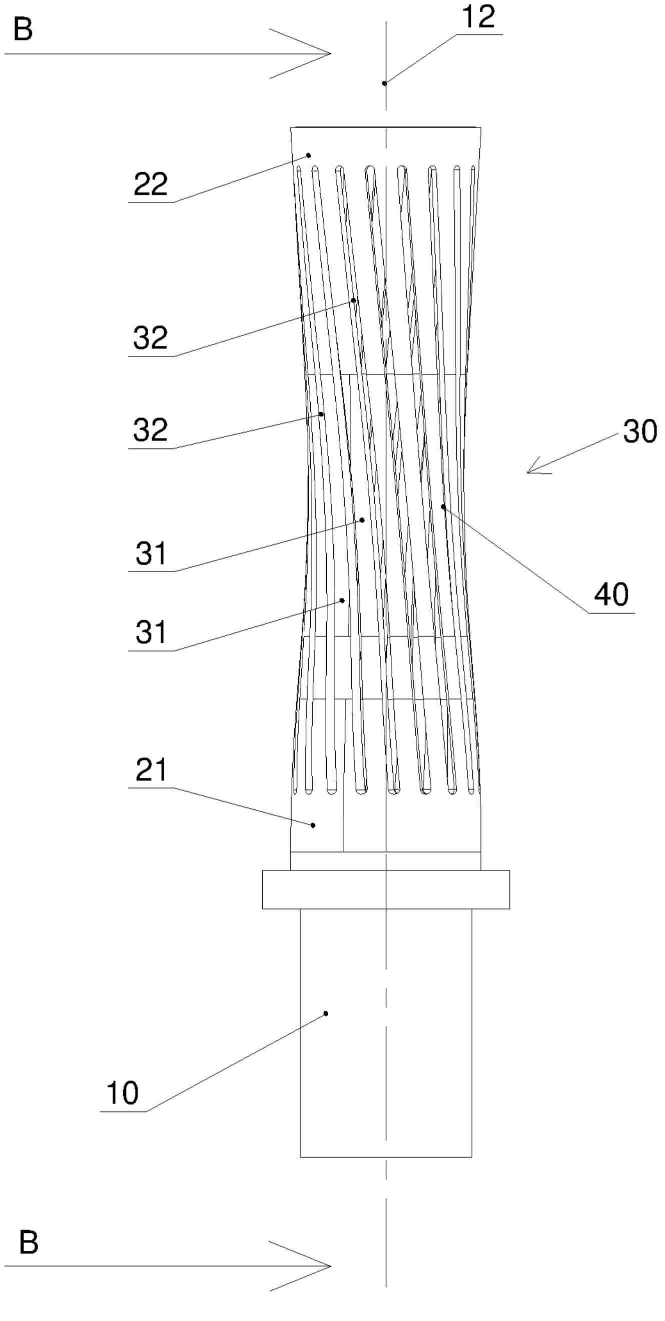
Figure 7:
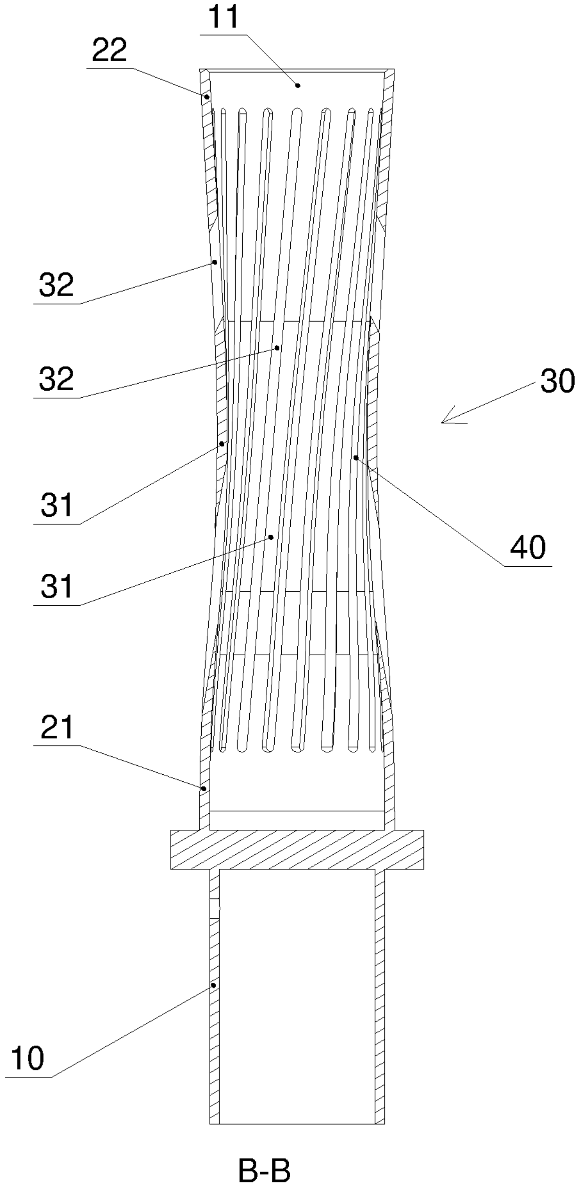
Figure 8:
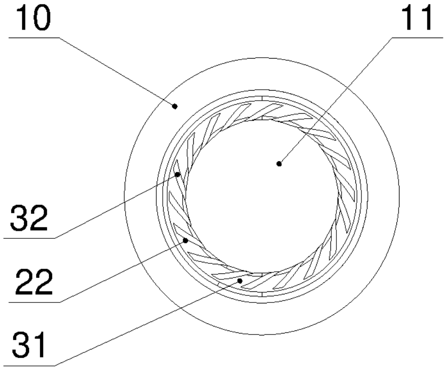
Figure 9:
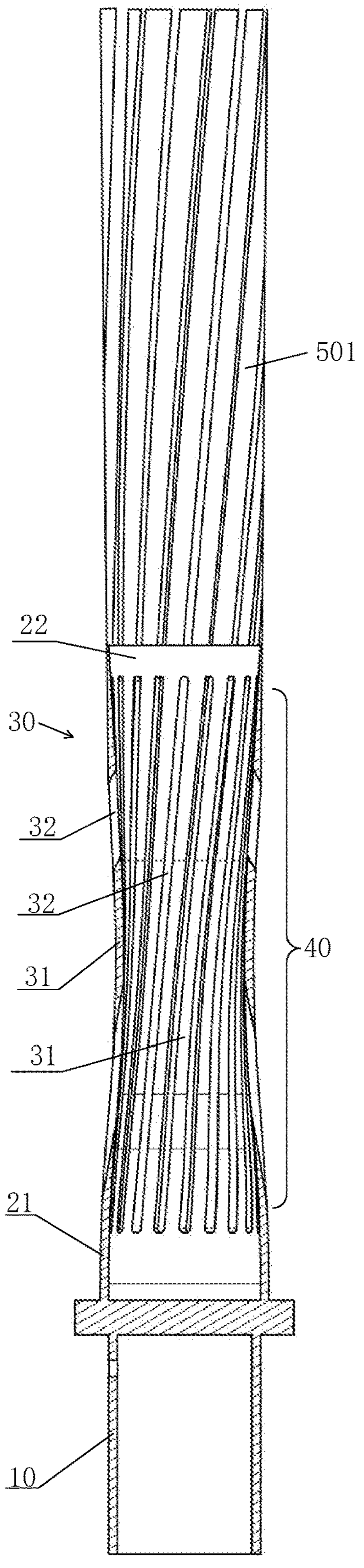

In an embodiment, the conducting portion 30 includes an inward recessed portion 40, as shown in FIGS. 5 to 7, an inner diameter of the inward recessed portion 40 gradually increases from a center of the inward recessed portion 40 to both ends thereof. When the external terminal enters the terminal hole 11, it squeezes against the side wall of the terminal hole 11 outwards, so that the side wall of the terminal hole 11 expands outward by their own elasticity. By providing the inward recessed portion 40, it is possible to make the terminal have a large contact area with the external terminal even when the terminal is expanded outwards, thereby reducing contact resistance and improving the conductive property on the one hand, and on the other hand, ensuring the reliability of mechanical connection to better avoid loosening. As shown in FIG. 7, an outer diameter of the outer wall of the inward recessed portion 40 gradually increases from the center of the inward recessed portion 40 to both ends thereof along with its inner wall.

Figure 2:
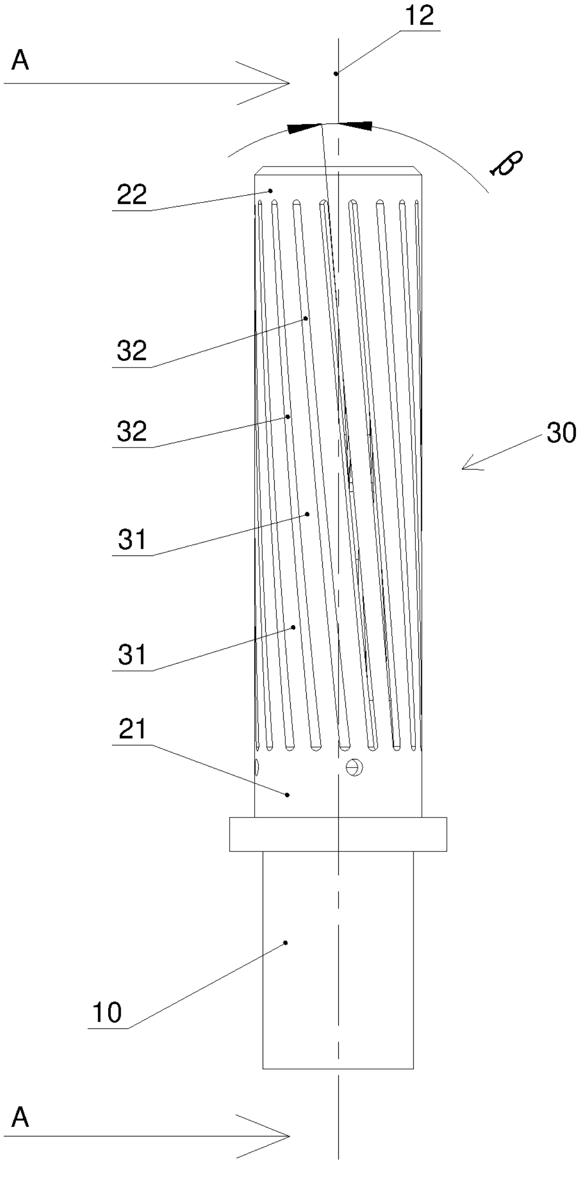
Figure 3:
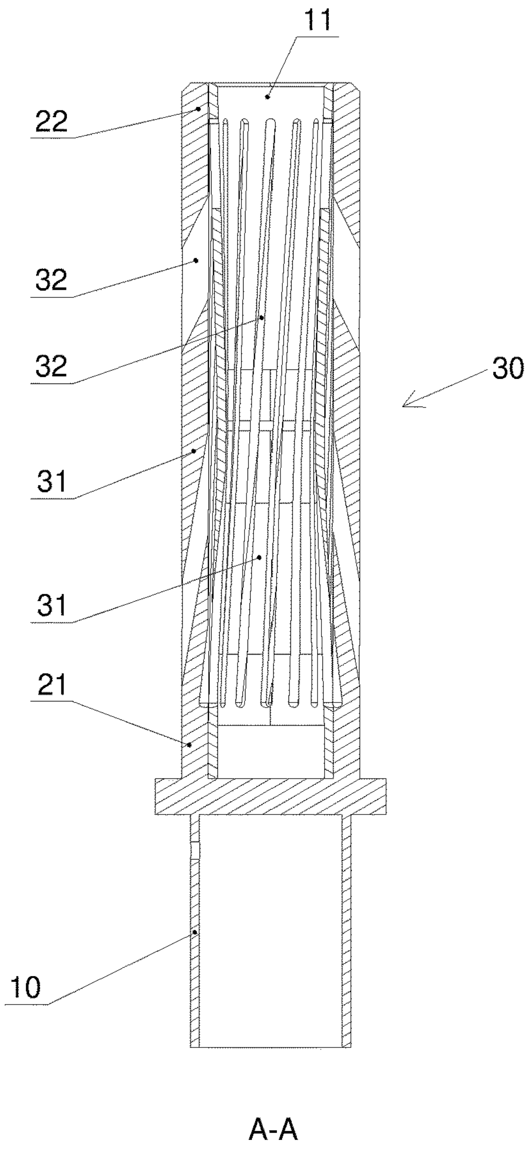
Figure 4:
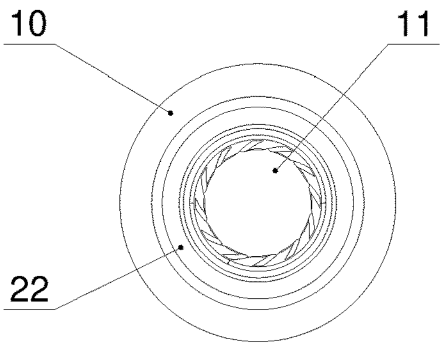

As shown in FIGS. 2 and 6, the first grooves 32 are disposed obliquely to the axis 12 of the terminal, and the elastic sheets 31 are also disposed obliquely to the axis 12 of the terminal. When the external terminal is plugged into the terminal hole 11, the inclined elastic sheets 31 can generate a large resistance to the external terminal to prevent the external terminal from exiting outward in the axis 12 of the terminal, and at the same time prevent the external terminal from rotating around the axis 12 of the terminal, so that the external terminal is more securely connected to the terminal. An angle of inclination of the first grooves 32 with respect to the axis 12 of the terminal is equal to an angle of inclination of the elastic sheets 31 with respect to the axis 12 of the terminal.

The first grooves 32 is disposed obliquely to the axis 12 of the terminal in a non-limiting way, and for example, a longitudinal boundary line of a first groove 32 is located in a plane that is disposed obliquely to the axis 12 of the terminal, so that the first groove 32 extends obliquely with respect to the axis 12 of the terminal, and the angles of inclination of tangent lines at different positions of the first groove 32 in longitudinal direction of the first groove 32 with respect to the axis 12 of the terminal are different.

The inventor has made further improvements to the terminal as follows: the angles between tangent lines of the first groove 32 at all positions of the first groove 32 and the axis 12 of the terminal are equal, which can further improve stability of the connection between the terminal and the external terminal as well as conductive performance. Further, as shown in FIG. 2, the angle β between the tangent line of the first groove 32 and the axis 12 of the terminal is 10° to 60°.

In order to test influence of different angles β on the electric conductivity, the inventor selects 10 terminals of the same material, the same size and different angles to carry out the experiment, in which the terminals are plugged, then the plugged terminals are conducted current, and the electric conductivity at the plug position of the corresponding terminals is detected. The test results are shown in Table 1. In this embodiment, the electric conductivity greater than 99% is an ideal value.

TABLE 1

| Influence of different angles on electric conductivity | | | | | | | | | |
|---|---|---|---|---|---|---|---|---|---|
| value of the angle β (°) | | | | | | | | | |
| 8% | 10 | 15 | 20 | 30 | 40 | 50 | 55 | 60 | 65 |
| Electric conductivity (%) | | | | | | | | | |
| 98.72 | 99.36 | 99.57 | 99.67 | 99.82 | 99.87 | 99.76 | 99.73 | 99.62 | 99.33 |

As can be seen from Table 1, when the angle R is less than 10°, the electric conductivity does not reach the ideal value range, and the conductive effect decreases; when the angle β is greater than 60°, although the electric conductivity meets the ideal value range, a declining trend appears, and the terminal with an angle β greater than 60° is very difficult to be processed and does not have practical value. Therefore, the inventor selects a value of the angle β to be 10° to 60°, which is most suitable for production and processing and has very ideal conductive performance.

In an embodiment, the conducting portion 30 and the first fixing portion 21 are connected together by crimping, welding, or screw connection. In some cases, the conducting portion 30 includes a plurality of independent elastic sheets 31, and one ends of the elastic sheets 31 are fixed to the first fixing portion 21, so that the elastic sheets 31 are distributed at intervals in the circumferential direction. The one ends of the elastic sheets 31 may be fixed to the first fixing portion 21 by crimping, welding, or screw connection. In another embodiment, the conducting portion 30 and the first fixing portion 21 are integrally formed. Specifically, the first fixing portion 21 and the conducting portion 30 can be an integral hollow cylinder structure, and a plurality of first grooves 32 are provided on the wall of the cylinder, so that an elastic sheet 31 is formed between any two adjacent first grooves 32, which reduces the difficulty of assembling and processing the terminal and is conducive to cost saving.

In order to improve the conductive performance of the terminal, the inventor has made further improvements as follows: the terminal includes a conducting cylinder 50 that sleeves on the outer side of the conducting portion 30, the conducting cylinder 50 is provided with second grooves 51 extending in the axial direction of the terminal, the elastic sheets 31 can enter into the second grooves 51, and the conducting cylinder 50 and the conducting portion form a double-layer structure. When the terminal is a female terminal, an external terminal inserted into the terminal drives the elastic sheets 31 of the conducting portion 30 to expand outward and to enter into the second grooves 51, such that the conducting cylinder 50 and the conducting portion 30 both comes into contact with the external terminal, which increases the contact area between the terminal and the external terminal, improves the conductive performance, and improves stability of the connection between the terminal and the external terminal, and better prevents the external terminal from rotating relative to the terminal. Exemplarily, a gap is provided between the conducting cylinder 50 and the conducting portion 30, that is, a deformation space for the conducting portion 30 to expand outwards is provided between the inner wall of the conducting cylinder 50 and the outer wall of the conducting portion 30. Exemplarily, the conducting cylinder 50 is elastic, and can expands outward by the extrusion of the external terminal.

Figure 10:
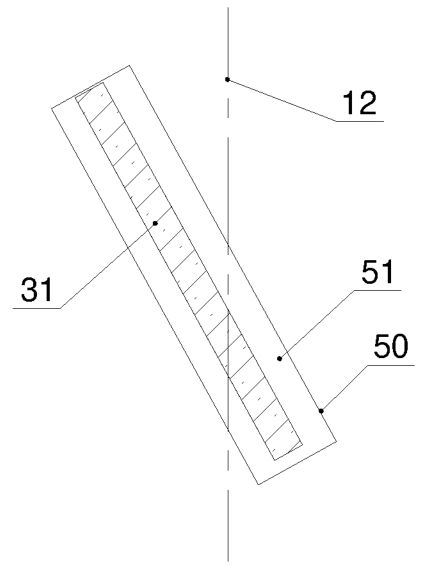
FIGS. 10 to 12 are schematic diagrams of a conducting cylinder and a conducting portion that are matched with each other in a terminal provided by the present application.
Figure 11:
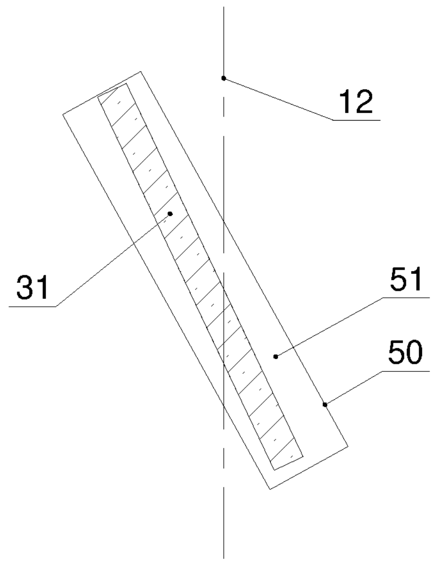

Further, the second grooves 51 are disposed obliquely to the axis 12 of the terminal, and the elastic sheets 31 are aligned with the second grooves 51, respectively. In some cases, as shown in FIG. 10, the angle of inclination of the second groove 51 is equal to the angle of inclination of the elastic sheet 31. In some other cases, the angle of inclination of the second groove 51 is not equal to the angle of inclination of the elastic sheet 31. Exemplarily, as shown in FIG. 11, the angle of inclination of the second groove 51 is smaller than the angle of inclination of the elastic sheet 31.

Figure 12:
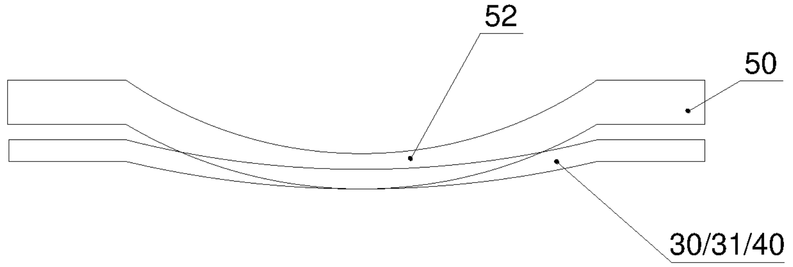

Further, the conducting cylinder 50 is provided with a cylinder recess portion 52, an inner diameter of which gradually increases from the center of the cylinder recess portion 52 to both ends thereof. The cylinder recess portion 52 can expand outward by the extrusion of the external terminal that is inserted into the terminal. Both the cylinder recess portion 52 and the inward recessed portion 40 can exert extrusion force on the external terminal at the same time to improve the stability of the connection. Further, as shown in FIG. 12, the recessed degree of the cylinder recess portion 52 is greater than the recessed degree of the inward recessed portion 40, which facilitates simultaneous contact of both the conducting cylinder 50 and the elastic sheet 31 with the external terminal, thereby increasing the contact area. Exemplarily, the conducting cylinder 50 and the conducting portion 30 may be an integrated mechanism.

Further, the ratio of the surface area of the portion of the elastic sheet that enters into the second groove to the surface area of the second groove is 50% to 90%, to ensure sufficient contact area, thereby ensuring that the electric conductivity meets the actual needs.

In order to test the influence of different ratios on the electric conductivity of the terminal, the inventor selects conducting cylinders 50 of the same specification and ten kinds of conducting portions 30 of different sizes for testing. The ratios of the surface area of the portion of the elastic sheet that enters into the second groove to the surface area of the second groove are 45%, 50%, 55%, 60%, 65%, 70%, 75%, 80%, 85%, 90%, 95%, respectively. After the terminals are plugged, the plugged terminals are conducted current, and the electric conductivity at the plug position of the corresponding terminals is detected. The test results are shown in Table 2. In this embodiment, the electric conductivity greater than 99% is an ideal value.

TABLE 2

| Influence of different ratios on the electric conductivity of the terminal: | | | | | | | | | | |
|---|---|---|---|---|---|---|---|---|---|---|
| The ratios of the surface area of the portion of the elastic sheet that enters the second groove to the surface area of the second groove (%) | | | | | | | | | | |
| 45 | 50 | 55 | 60 | 65 | 70 | 75 | 80 | 85 | 90 | 95 |
| Electric conductivity of the plugged terminals | | | | | | | | | | |
| 98.9 | 99.3 | 99.5 | 99.6 | 99.6 | 99.7 | 99.8 | 99.8 | 99.8 | 99.9 | 99.8 |

As can be seen from Table 1, when the ratio of the surface area of the portion of the elastic sheet that enters into the second groove to the surface area of the second groove is smaller than 50%, the electric conductivity does not reach the ideal value range, and the electric conductivity of the terminal decreases obviously. When the ratio of the surface area of the portion of the elastic sheet that enters into the second groove to the surface area of the second groove is greater than 90%, although the electric conductivity reaches the ideal value range, a declining trend appears. Considering that the terminal is difficult to process and assemble when the ratio of the surface area of the portion of the elastic sheet that enters into the second groove to the surface area of the second groove is greater than 90%, the inventor selects the most suitable range of the ratio of the surface area of the portion of the elastic sheet that enters into the second groove to the surface area of the second groove to be 50% to 90%.

In some embodiments, the conducting portion 30 and/or the conducting cylinder 50 are made of a material containing tellurium.

Further, the material of the conducting portion 30 and/or the conducting cylinder 50 has a content of tellurium of 0.1% to 5%.

That is to say, the conducting portion 30 and/or the conducting cylinder 50 are made of tellurium-copper alloy, so that the terminal has good conductive performance and free-cutting property, thereby ensuring the electrical property and improving the processability, and the elasticity of the tellurium-copper alloy is also excellent. Exemplarily, the tellurium-copper alloy has a content of tellurium of 0.2% to 1.2%.

The inventor selects ten terminals of the same shape for testing. The conducting portions 30 of the terminals have the same size and are all made of tellurium-copper alloy, and the conducting cylinders 50 of the terminals have the same size and are all made of tellurium-copper alloy. The content of tellurium is 0.05%, 0.1%, 0.2%, 0.5%, 0.8%, 1.2%, 2%, 3%, 5%, 6%, 7%, respectively. After the terminals are plugged, the plugged terminals are conducted current, and the electric conductivity at the plug position of the corresponding terminals is detected. The test results are shown in Table 3. In this embodiment, the electric conductivity greater than 99% is an ideal value.

TABLE 3

Influence of tellurium-copper alloys with different tellurium content on electric conductivity of the terminal

| Tellurium content | 0.05 | 0.1 | 0.2 | 0.5 | 0.8 | 1.2 | 2 | 3 | 5 | 6 | 7 |
|---|---|---|---|---|---|---|---|---|---|---|---|
| Electric conductivity (%) | 98.3 | 98.8 | 99.6 | 99.8 | 99.8 | 99.7 | 99.6 | 99.5 | 99.4 | 98.9 | 98.5 |

As can be seen from Table 2, when the content of tellurium is less than 0.1% or greater than 5%, the electric conductivity decreases significantly, which cannot meet the requirement of the ideal value of the electric conductivity. When the content of tellurium is greater than or equal to 0.2% and less than or equal to 1.2%, the electric conductivity is the best. When the content of tellurium is greater than 1.2% and less than or equal to 5%, although the electric conductivity meets the ideal value requirement, a declining trend appears, and the conductive performance will also decline. Therefore, the inventor selects a tellurium-copper alloy with a tellurium content of 0.1% to 5%. Most ideally, a tellurium-copper alloy with a tellurium content of 0.2% to 1.2% is selected.

In some embodiments, the conducting portion 30 and the conducting cylinder 50 are provided with a plating layer to improve corrosion resistance, improve conductive performance, increase the number of times of plugging, and better prolong the service life of the conducting portion 30 and the conducting cylinder 50.

The plating layer can be made by electroplating, chemical plating, magnetron sputtering or vacuum plating or the like. The electroplating is a process of plating, on a surface of some metal, a thin layer of other metal or alloy by using electrolysis principle. The chemical plating is a deposition process that produces a metal through a controllable oxidation-reduction reaction under a metal catalytic action. The magnetron sputtering is to use an interaction of a magnetic field and an electric field to make electrons move spirally near a target surface, thereby increasing the probability that electrons bombard argon to generate ions. The generated ions bombard the target surface under the action of the electric field so as to sputter a target material. The vacuum plating is to deposit various metal and non-metal films on the surface of plastic parts by means of distillation or sputtering under a vacuum condition.

The plating layers on the conducting portion 30 and the conducting cylinder 50 have the same thickness. Since the plating layers have the same thickness, they can be electroplated in one time during the processing, and there is no need to carry out complex electroplating processing in order to obtain different thicknesses of the plating layers in different regions, so as to save processing costs and reduce electroplating pollution.

The material of the plating layer on the conducting portion 30 is not the same with that of the plating layer on the conducting cylinder 50. Different plating layers can be selected according to the need. For example, a combination with higher electric conductivity may be selected according to the need, or a combination with better corrosion resistance may be selected, or a combination that is most suitable for the actual working environment may be selected by taking various factors into consideration.

The plating layer is made of one or more selected from the group consisting of gold, silver, nickel, tin, zinc, tin-lead alloy, silver-antimony alloy, palladium, palladium-nickel alloy, graphite-silver, graphene-silver and silver-gold-zirconium alloy. Copper, as an active metal, undergoes an oxidation reaction with oxygen and water during use, therefore, one or more inactive metals are needed to make the plating layer to prolong the service life of the terminal. In addition, for a metal contact that needs to be plugged and unplugged frequently, a metal with good wear resistant is needed to make the plating layer, which can greatly prolong the service life of the contact. In addition, the contact needs excellent conductive property, and the above-mentioned metals have better electric conductivity and stability than the copper or copper alloys, thereby making the terminal obtain better electrical property and longer service life.

In order to demonstrate the influence of different materials of the plating layer on the overall performance of the terminal, the inventor adopts terminal samples and mating terminals to carry out a series of tests on the number of times of plugging and unplugging and the corrosion resistance time. The terminal samples have the same specification and the same material, and have plating layers with different materials. The mating terminals have the same specification. In order to demonstrate the advantages and disadvantages of the selected materials and other commonly used electroplating materials, the inventor also adopts tin, nickel and zinc as the materials of the plating layer for the experiment. The experimental results are shown in Table 4 below.

The numbers of times of plugging and unplugging in Table 4 are obtained as follows: the terminals are fixed on the experiment platform respectively; a mechanical device is used to simulate the plugging and unplugging of the terminals; and after every 100 times of plugging and unplugging, stop plugging and unplugging and observe the damage of the plating layer on the surface of the terminal. When the plating layer on the surface of the terminal is scratched and the material of the terminal itself is exposed, the experiment is stopped and the number of times of plugging and unplugging at that time is recorded. In this embodiment, if the number of times of insertion and removal is less than 8000, it is considered as unqualified.

The test on corrosion resistance time in Table 4 below is to put the terminal into a salt fog spraying test chamber, spray salt fog to each position of the terminal, and take the terminal out every 20 hours to clean the terminal and observe surface corrosion of the terminal, which is a cycle. When the corrosion area of the surface of the terminal is greater than 10% of the total area of the surface of the terminal, the test is stopped and the number of cycles at that time is recorded. In this embodiment, if the number of cycles is less than 80, it is considered as unqualified.

As can be seen from Table 4 below, when the material of the plating layer is commonly used metal, such as tin, nickel and zinc, the experimental results are far inferior to the selected metals. Although the plating layer made of nickel is qualified in the experiment of the number of times of plugging and unplugging, it is not outstanding and is not qualified in the salt spray experiment. When the selected metals are used, the experimental results are much greater than the standard value, and the performance is stable. Therefore, the inventor selects the material of the plating layer to be one or more selected from the group consisting of gold, silver, silver-antimony alloy, graphite-silver, graphene-silver, palladium-nickel alloy, tin-lead alloy, and silver-gold-zirconium alloy.

TABLE 4

Influence of different materials of the plating layer on the number of times of plugging and unplugging and corrosion resistance of the terminal Different materials of the plating layer

| Gold | Silver | Silver antimony Alloy | Graphit-silver | Graphene-silver | Silver gold-zirconium Alloy | Tin | Nickel | Palladium | Palladium-nickel Alloy | Tin-lead Alloy | Zinc |
|---|---|---|---|---|---|---|---|---|---|---|---|
| Number of Times of plugging and unplugging (times) | | | | | | | | | | | |
| 12400 | 11800 | 12200 | 12000 | 12700 | 12100 | 8200 | 8400 | 11100 | 12000 | 10000 | 8500 |
| Number of Corrosion Resistance Test Cycles (times) | | | | | | | | | | | |
| 131 | 128 | 120 | 130 | 127 | 131 | 82 | 89 | 110 | 120 | 111 | 88 |

In some embodiments, the plating layer includes a bottom layer and a surface layer.

Further, the plating layer is made by a multilayer plating method. After being processed, the conducting portion 30 and the conducting cylinder 50 have many gaps and holes on their surface and below their surface microscopic interfaces, and these gaps and holes will cause wear and corrosion of the conducting portion 30 and the conducting cylinder 50 during use. Therefore, firstly a bottom layer is plated on the surface of the conducting portion 30 and the surface of the conducting cylinder 50, respectively, to fill the gaps and holes, so that the surfaces of the conducting portion 30 and the conducting cylinder 50 are flat and have no holes, and then a surface layer is plated on the surface of the conducting portion 30 and the surface of the conducting cylinder 50, respectively, so that the plating layers are combined with the surfaces more firmly, and the surfaces are more smoothly. Since there are no gaps and holes on the surface of the plating layer, the wear resistance, corrosion resistance and electrical performance of the terminal are better, and the service life of the terminal is greatly prolonged.

The bottom layer is made of one or more selected from the group consisting of gold, silver, nickel, tin, tin-lead alloy and zinc. The surface layer is made of one or more selected from the group consisting of gold, silver, nickel, tin, tin-lead alloy, silver-antimony alloy, palladium, palladium-nickel alloy, graphite-silver, graphene-silver and silver-gold-zirconium alloy.

In another embodiment, the bottom layer has a thickness of 0.01 μm to 12 μm. Exemplarily, the bottom layer has a thickness of 0.1 μm to 9 μm.

In another embodiment, the surface layer has a thickness of 0.5 μm to 50 μm. Exemplarily, the surface layer has a thickness of 1 μm to 35 μm.

In order to demonstrate the influence of the thickness of the bottom layer of the plating layer on the overall performance of the terminal, the inventor adopts terminal samples and mating terminals to carry out a series of tests on temperature rise and the corrosion resistance time. The terminal samples have the same specification and the same material, have nickel bottom layers of different thicknesses, and have silver surface layers of the same thickness. The mating terminals have same specification. The experimental results are shown in Table 5 below.

The test on temperature rises in Table 5 is to supply the same current to the terminals and the mating terminals that are respectively plugged with each other, detect the temperatures of the terminals at the same position before the current supply and after the temperature is stable in a closed environment, and take a difference therebetween to obtain an absolute value. In this embodiment, if the temperature rise is greater than 50K, it is considered as unqualified.

The test on corrosion resistance time in Table 5 is to put the terminal into a salt fog spraying test chamber, spray salt fog to each position of the terminal, and take the terminal out every 20 hours to clean the terminal and observe surface corrosion of the terminal, which is a cycle. When the corrosion area of the surface of the terminal is greater than 10% of the total area of the surface of the terminal, the test is stopped and the number of cycles at that time is recorded. In this embodiment, if the number of cycles is less than 80, it is considered as unqualified.

As can be seen from Table 5 above, when the thickness of the nickel bottom layer is smaller than 0.01 although the temperature rise of the terminal is qualified, the number of corrosion resistance cycles of the terminal is smaller than 80 due to the plating layer being too thin, which does not meet the performance requirement of the terminal, has a great impact on both the overall performance and service life of the plugged terminals, and may cause the service life of the product to decrease sharply or even failure of the product and combustion accidents in serious cases. When the thickness of the nickel bottom layer is greater than 12 μm, the heat generated by the terminal cannot be radiated due to the bottom layer being too thick, which makes the temperature rise of the terminal unqualified, and in addition, the thick plating layer is easy to fall off the surface of the terminal, resulting in a decrease in the number of cycles of corrosion resistance. Therefore, the inventor selects the thickness of the bottom layer of the plating layer to be 0.01 μm to 12 μm. Exemplarily, the inventor finds that when the thickness of the bottom layer of the plating layer is 0.1 μm to 9 μm, the combined effect of the temperature rise and corrosion resistance of the terminal is better. Therefore, in order to further improve the safety, reliability and practicality of the product itself, the thickness of the bottom layer of the plating layer is exemplarily 0.1 μm to 9 μm.

TABLE 5

Influence of different thicknesses of the bottom layer of the plating layer on temperature rise and corrosion resistance of the terminal

| Different thicknesses of the nickel bottom layer (μm) | 0.001 | 0.005 | 0.01 | 0.05 | 0.1 | 0.5 | 1 | 3 | 5 |
|---|---|---|---|---|---|---|---|---|---|
| Temperature Rise of Plug-in Terminals (k) | 10.1 | 12.2 | 14.9 | 16 | 18.2 | 21.9 | 24.5 | 26.7 | 28.6 |
| Number of Corrosion Resistance Test Cycles (times) | 69 | 78 | 82 | 93 | 105 | 109 | 113 | 117 | 120 |

| Different thicknesses of the nickel bottom layer (μm) | 6 | 9 | 10 | 11 | 12 | 13 | 15 |
|---|---|---|---|---|---|---|---|
| Temperature Rise of Plug-in Terminal (k) | 31.3 | 35.9 | 40.3 | 43.5 | 44.8 | 56.1 | 60.4 |
| Number of Corrosion Resistance Test Cycles (times) | 122 | 128 | 129 | 130 | 131 | 129 | 127 |

In order to demonstrate the influence of the thickness of the surface layer of the plating layer on the overall performance of the terminal, the inventor adopts terminal samples and mating terminals to carry out a series of tests on temperature rise and the corrosion resistance time. The terminal samples have the same specification and the same material, have nickel bottom layers of the same thickness, and have silver surface layers of different thicknesses. The mating terminals have the same specification. The experimental results are shown in Table 6 below.

The experimental method is the same as above.

TABLE 6

Influence of different thicknesses of the surface layer of the plating layer on temperature rise and corrosion resistance

| Different thicknesses of the silver surface layer (μm) | | | | | | | | |
|---|---|---|---|---|---|---|---|---|
| 0.1 | 0.5 | 1 | 1.5 | 5 | 10 | 15 | 20 | 25 |
| Temperature Rise of Plug-in Terminals (k) | | | | | | | | |
| 11.4 | 13.8 | 15.2 | 17.5 | 21.8 | 23.9 | 25.4 | 28.6 | 31.5 |
| Number of Corrosion Resistance Test Cycles (times) | | | | | | | | |
| 75 | 81 | 91 | 93 | 95 | 97 | 98 | 102 | 105 |
| Different thicknesses of the silver surface layer (μm) | | | | | | | | |
| 30 | 35 | 40 | 45 | 50 | 55 | 60 | 65 | |
| Temperature Rise of Plug-in Terminals (k) | | | | | | | | |
| 35.6 | 38.9 | 42.7 | 45.3 | 48.2 | 52.5 | 53.8 | 69.6 | |
| Number of Corrosion Resistance Test Cycles (times) | | | | | | | | |
| 111 | 113 | 117 | 119 | 122 | 125 | 124 | 121 | |

As can be seen from Table 6 above, when the thickness of the silver surface layer is smaller than 0.5 μm, although the temperature rise of the terminal is qualified, the number of corrosion resistance cycles of the terminal is smaller than 80 due to the plating layer being too thin, which does not meet the performance requirement of the terminal, has a great impact on both the overall performance and service life of the plugged terminals, and may cause the service life of the product to decrease sharply or even failure of the product and combustion accidents in serious cases. When the thickness of the silver surface layer is greater than 50 μm, the heat generated by the terminal cannot be radiated due to the bottom layer being too thick, which makes the temperature rise of the terminal unqualified, and in addition, the thick plating layer is easy to fall off the surface of the terminal, resulting in a decrease in the number of cycles of corrosion resistance. Moreover, since the material the surface layer of the plating layer is expensive metal, if the plating layer has a great thickness but fails to improve performance, it is not valuable for use. Therefore, the inventor selects the silver surface layer to be 0.1 μm to 50 μm. Exemplarily, the inventor finds that when the thickness of the bottom layer of the plating layer is 1 μm to 35 μm, the combined effect of the temperature rise and corrosion resistance of the terminal is better. Therefore, in order to further improve the safety, reliability and practicality of the product itself, the thickness of the bottom layer of the plating layer is exemplarily 1 μm to 35 μm.

The terminal is connected to the mating terminal through the conducting portion 30, and connected to the cable through the connecting portion 10. The connecting portion 10 may be of a cylindrical shape or a solid column shape or a solid plate shape. In the exemplary embodiment, the cross section of the connecting portion 10 is of round, oval, polygon, flat, diamond, semi-arc, arc, or wavy shape. The cross section of the connecting portion 10 may be designed into various shapes, which is convenient for the designers to select terminals of different shapes according to the actual terminal layout environment, so as to reduce the volume of the plug-in structure, optimize the contact area, and improve the electrical performance of the terminal. Moreover, the shape of the internal cross-section of the terminal is diverse, so that the terminal can be matched with the mating terminal of various shapes, which can provide more choices for the designers.

Figure 13:
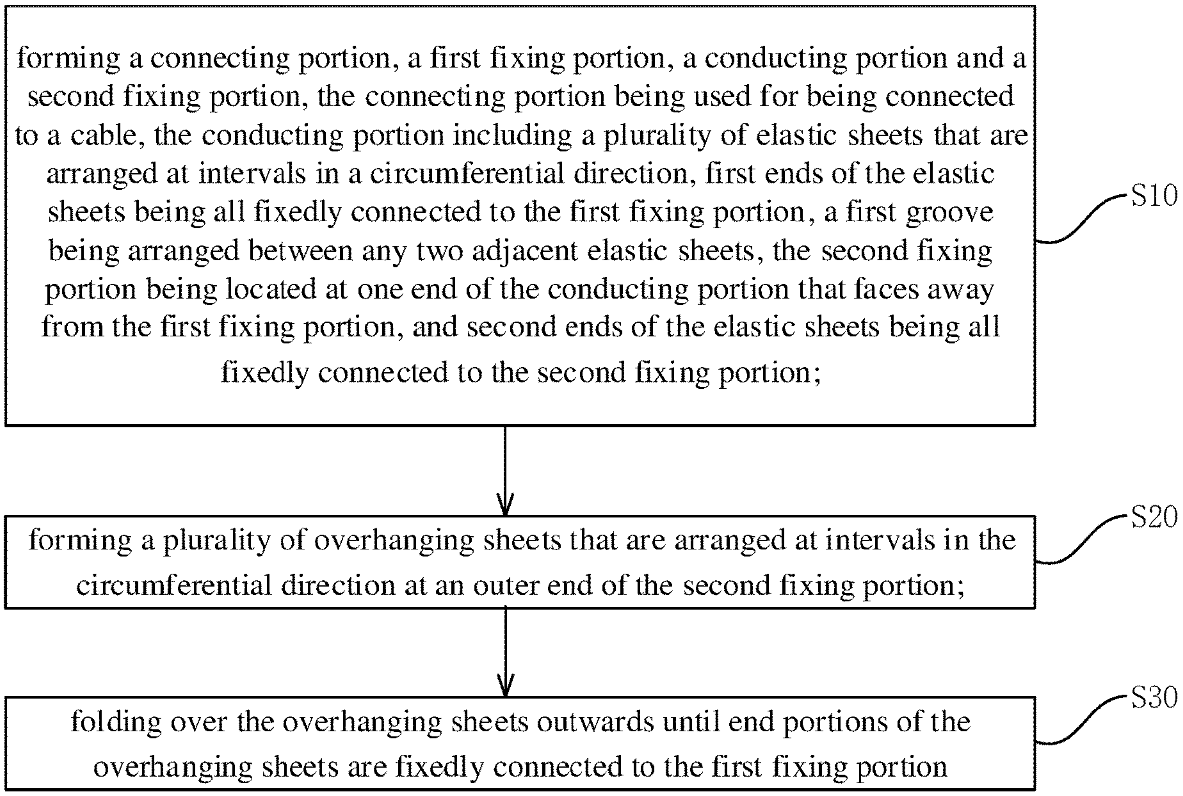
FIG. 13 is a schematic diagram of a processing method of a terminal provided by the present application.

An embodiment of the second aspect of the present application provides a processing method of a terminal. As shown in FIG. 13, the processing method of the terminal includes: step S10: forming a connecting portion 10, a first fixing portion 21, a conducting portion 30 and a second fixing portion 22, the connecting portion 10 being used for being connected to a cable, the conducting portion 30 including a plurality of elastic sheets 31 that are arranged at intervals in a circumferential direction, first ends of the elastic sheets 31 being all fixedly connected to the first fixing portion 21, a first groove 32 being arranged between any two adjacent elastic sheets 31, the second fixing portion 22 being located at one end of the conducting portion 30 that faces away from the first fixing portion 21, and the second ends of the elastic sheets 31 being all fixedly connected to the second fixing portion 22; step S20: forming a plurality of overhanging sheets 501 that are arranged at intervals in the circumferential direction at an outer end of the second fixing portion 22; step S30: folding over the overhanging sheets 501 outwards until end portions of the overhanging sheets are fixedly connected to the first fixing portion 21 to form a conducting cylinder 50 that sleeves on an outer side of the conducting portion 30.

In the terminal processed by the processing method, two ends of the overhanging sheet are respectively fixed to the first fixing portion 21 and the second fixing portion 22, a plurality of overhanging sheets form the conducting cylinder 50 described above being a double-layer structure, and the conducting cylinder 50 and the conducting portion 30 form a double-layer structure. The conducting cylinder 50 and the conducting portion 30 can both come into contact with the external terminal, which increases the contact area between the terminal and the external terminal, improves the conductive performance, and can better prevent the external terminal from rotating relative to the terminal and improve stability of the connection between the terminal and the external terminal.

In an embodiment of the present application, in the step S30, the overhang sheets are firmly connected to the first fixing portion 21 by means of crimping, welding, and screw connection.

The above descriptions are only embodiments of the present application and are not intended to limit the application. Various changes and modifications can be made to the present application by those skilled in the art. Any modifications, equivalents, improvements, etc. made within the spirit and scope of the present application are intended to be included within the scope of the claims of the present application.

The invention claimed is:

1. A terminal comprising a connecting portion, a first fixing portion, and a conducting portion that are connected in sequence, the connecting portion being used for being connected to a cable;

wherein the conducting portion comprises a plurality of elastic sheets that are arranged at intervals in a circumferential direction, first ends of the elastic sheets are all fixedly connected to the first fixing portion, and a first groove is arranged between any two adjacent elastic sheets;

the terminal comprises a conducting cylinder that sleeves on an outer side of the conducting portion, the conducting cylinder is provided with second grooves extending in an axial direction of the terminal, and the elastic sheets are capable of entering into the second grooves;

the conducting cylinder and the conducting portion form a double-layer structure;

in a state where an external terminal is inserted into the terminal, the elastic sheets of the conducting portion is driven by the external terminal to expand outward and enter into the second grooves, such that both the conducting cylinder and the conducting portion are in contact with the external terminal;

both the elastic sheets and the second grooves are disposed obliquely relative to an axis of the terminal, wherein angles of inclination of the second grooves relative to the axis are not equal to angles of inclination of the elastic sheets relative to the axis when viewed in a direction perpendicular to the axis.

2. The terminal according to claim 1, wherein the conducting portion and the first fixing portion are integrally formed; or the conducting portion and the first fixing portion are connected together by crimping, welding, or screw connection.

3. The terminal according to claim 1, wherein the second groove has a first width in a circumferential direction of the conducting cylinder and a first length in an axial direction of the conducting cylinder, and a surface area of the second groove is defined as a product of the first width and the first length;

in the state where the external terminal is inserted into the terminal, a portion of the elastic sheet is received in the second groove, wherein said portion has a second width in a circumferential direction of the conducting portion and a second length in an axial direction of the conducting portion, and a surface area of said portion is defined as a product of the second width and the second length;

a ratio of the surface area of said portion of the elastic sheet to the surface area of the second groove is 50% to 90%.

4. The terminal according to claim 1, wherein the conducting portion and/or the conducting cylinder are made of a material containing tellurium;

and the material of the conducting portion and/or the conducting cylinder has a content of tellurium of 0.1% to 5%.

5. The terminal according to claim 1, wherein a cross-section of the connecting portion is of round, oval, polygon, flat, diamond, semi-arc, arc, or wavy shape.

6. The terminal according to claim 1, wherein each of the angles of inclination of the second grooves relative to the axis is less than each of the angle of inclination of the elastic sheets relative to the axis.

7. The terminal according to claim 1, wherein both ends of the conducting cylinder are fixedly connected to the first fixing portion and the second fixing portion, respectively.

8. The terminal according to claim 1, wherein the terminal comprises a second fixing portion located at one end of the conducting portion that faces away from the first fixing portion, and second ends of the elastic sheets are all fixedly connected to the second fixing portion.

9. The terminal according to claim 8, wherein the terminal is provided with a terminal hole extending throughout the second fixing portion and the conducting portion.

10. The terminal according to claim 9, wherein the conducting portion comprises an inward recessed portion, and an inner diameter of the inward recessed portion gradually increases from a center of the inward recessed portion to both ends thereof.

11. The terminal according to claim 1, wherein angles between tangent lines of the first groove at all positions of the first groove and the axis of the terminal are equal.

12. The terminal according to claim 11, wherein the angles between the tangent lines of the first groove and the axis of the terminal are 10° to 60°.

13. The terminal according to claim 1, wherein a plating layer is provided on the conducting portion and/or the conducting cylinder.

14. The terminal according to claim 13, wherein a thickness of the plating layer on the conducting portion and/or the conducting cylinder is uniform; and material of the plating layer on the conducting portion and/or the conducting cylinder is not uniform.

15. The terminal according to claim 13, wherein the plating layer is made of one or more selected from the group consisting of gold, silver, nickel, tin, zinc, tin-lead alloy, silver-antimony alloy, palladium, palladium-nickel alloy, graphite-silver, graphene-silver and silver-gold-zirconium alloy; and the plating layer is made by electroplating, chemical plating, magnetron sputtering or vacuum plating.

16. The terminal according to claim 13, wherein the plating layer comprises a bottom layer and a surface layer.

17. The terminal according to claim 16, wherein the bottom layer is made of one or more selected from the group consisting of gold, silver, nickel, tin, tin-lead alloy and zinc; the surface layer is made of one or more selected from the group consisting of gold, silver, nickel, tin, tin-lead alloy, silver-antimony alloy, palladium, palladium-nickel alloy, graphite-silver, graphene-silver and silver-gold-zirconium alloy.

18. The terminal according to claim 16, wherein the bottom layer has a thickness of 0.01 μm to 12 μm or 0.1 μm to 9 μm.

19. The terminal according to claim 16, wherein the surface layer has a thickness of 0.5 μm to 50 μm, or 1 μm to 35 μm.

20. A processing method of a terminal, comprising:

step S10: forming a connecting portion, a first fixing portion, a conducting portion and a second fixing portion, wherein the connecting portion is used for being connected to a cable; the conducting portion comprises a plurality of elastic sheets that are arranged at intervals in a circumferential direction, first ends of the elastic sheets are all fixedly connected to the first fixing portion, and a first groove is arranged between any two adjacent elastic sheets; the second fixing portion is located at one end of the conducting portion that faces away from the first fixing portion, and second ends of the elastic sheets are all fixedly connected to the second fixing portion;

step S20: forming a plurality of overhanging sheets that are arranged at intervals in the circumferential direction at an outer end of the second fixing portion;

step S30: folding over the overhanging sheets outwards until end portions of the overhanging sheets are fixedly connected to the first fixing portion to form a conducting cylinder that sleeves on an outer side of the conducting portion;

wherein the conducting cylinder is provided with second grooves extending in an axial direction of the terminal, the elastic sheets are capable of entering into the second grooves, and the conducting cylinder and the conducting portion form a double-layer structure;

in a state where an external terminal is inserted into the terminal, the elastic sheets of the conducting portion is driven by the external terminal to expand outward and enter into the second grooves, such that both the conducting cylinder and the conducting portion are in contact with the external terminal;

both the elastic sheets and the second grooves are disposed obliquely relative to an axis of the terminal, wherein angles of inclination of the second grooves relative to the axis are not equal to angles of inclination of the elastic sheets relative to the axis when viewed in a direction perpendicular to the axis.

* * * * *